US008630853B2

(12) United States Patent  
Koshinaka

(10) Patent No.: US 8,630,853 B2  
(45) Date of Patent: Jan. 14, 2014

(54) SPEECH CLASSIFICATION APPARATUS, SPEECH CLASSIFICATION METHOD, AND SPEECH CLASSIFICATION PROGRAM

(75) Inventor: Takafumi Koshinaka, Tokyo (JP)

(73) Assignee: NEC Corporation, Tokyo (JP)

( * ) Notice: Subject to any disclaimer, the term of this patent is extended or adjusted under 35 U.S.C. 154(b) by 881 days.

(21) Appl. No.: 12/593,323

(22) PCT Filed: Mar. 13, 2008

(86) PCT No.: PCT/JP2008/054668  
§ 371 (c)(1),  
(2), (4) Date: Dec. 7, 2009

(87) PCT Pub. No.: WO2008/126627  
PCT Pub. Date: Oct. 23, 2008

(65) Prior Publication Data  
US 2010/0138223 A1     Jun. 3, 2010

(30) Foreign Application Priority Data

Mar. 26, 2007   (JP) ................................. 2007-079677

(51) Int. Cl.  
*G10L 15/06*       (2013.01)

(52) U.S. Cl.  
USPC ........................................................ 704/245

(58) Field of Classification Search  
USPC ................................................ 704/240–245  
See application file for complete search history.

(56) References Cited

U.S. PATENT DOCUMENTS

| 5,199,077 A | * | 3/1993 | Wilcox et al. | 704/256 |
| 5,715,367 A | * | 2/1998 | Gillick et al. | 704/254 |
| 5,970,239 A | * | 10/1999 | Bahl et al. | 704/245 |
| 7,457,745 B2 | * | 11/2008 | Kadambe et al. | 704/216 |
| 7,603,276 B2 | * | 10/2009 | Yoshizawa | 704/256.2 |

FOREIGN PATENT DOCUMENTS

| JP | 6-274635 A | 9/1994 |
| JP | 7-261789 A | 10/1995 |
| JP | 8-123468 A | 5/1996 |
| JP | 11-085184 A | 3/1999 |
| JP | 11-507443 A | 6/1999 |
| JP | 11-175090 A | 7/1999 |
| JP | 2002-519720 A | 7/2002 |
| JP | 2003-15684 A | 1/2003 |
| JP | 2003-022088 A | 1/2003 |
| JP | 2005-173569 A | 6/2005 |
| JP | 2006-84875 A | 3/2006 |

OTHER PUBLICATIONS

International Search Report for PCT/JP2008/054668 mailed Jun. 24, 2008.  
S. Chen, et al., "Automatic transcription of Broadcast News", Speech Communication, vol. 37 (2002), pp. 69-87.

(Continued)

*Primary Examiner* — Abul Azad

(57) ABSTRACT

A speech classification apparatus includes a speech classification probability calculation unit that calculates a probability (probability of classification into each cluster) that a latest one of the speech signals (speech data) belongs to each cluster based on a generative model which is a probability model, and a parameter updating unit that successively estimates parameters that define the generative model based on the probability of classification of the speech data into each cluster calculated by the speech classification probability calculation unit.

26 Claims, 7 Drawing Sheets

(56) References Cited

OTHER PUBLICATIONS

D. Liu, et al., "Online Speaker Clustering", BBN Technologies, presented at the International Conference on Acoustics, Speech, and Signal Processing 2004, pp. I-333-I-336.

H. Attias, "Inferring Parameters and Structure of latent Variable Models by Variational Bayes", Proceedings of the Fifteenth Conference on Uncertainty in Artificial Intelligence (1999).

H. Sun, et al, "Applied Mathematics [11] of the Iwanami Lecture, Mathematics of Information and Coding", Iwanami Book Store, Eighth Chapter, 1994.

Japanese Office Action for JP2009-509015 mailed on Mar. 12, 2013.

Shoei Sato et al. "Acoustic Model Adaptation by Selective Training Using 2-Stage Clustering", The Institute of Electronics, Information and Communication Engineers, Feb. 2002, vol. J85-D-II, No. 2, pp. 174-183.

* cited by examiner

FIG. 3

| ID | NUMBER OF SPEECHES | SPEECH DATA |
|---|---|---|
| 1 | 123 | $X_{1,1}, X_{1,2}, \cdots, X_{1,123}$ |
| 2 | 456 | $X_{2,1}, X_{2,2}, \cdots, X_{2,456}$ |
| 3 | 87 | $X_{3,1}, X_{3,2}, \cdots, X_{3,87}$ |
| ⋮ | ⋮ | ⋮ | ature vectors constituted from features that reflect a speaker or an environment, such as Mel-frequency cepstral coefficients (MFCC) often used in a speech recognition system, is employed.

SPEECH CLASSIFICATION APPARATUS, SPEECH CLASSIFICATION METHOD, AND SPEECH CLASSIFICATION PROGRAM

The present invention is the National Phase of PCT/JP2008/054668 filed on Mar. 13, 2008, which claims the priority of Japanese Patent Application No. 2007-079677 (filed on Mar. 26, 2007), the entirety of which is incorporated herein by reference.

TECHNICAL FIELD

The present invention relates to a speech classification apparatus, a speech classification method, and a speech classification program that cluster speeches. More specifically, the invention relates to a speech classification apparatus, a speech classification method, and a speech classification program that cluster a plurality of speech signals issued by different speakers or in different environments into clusters based on similarity of the speakers or the environments.

BACKGROUND ART

As an example of a related art about the speech classification method, a description in Non-patent Document 1 is referred to, for example. FIG. 6 is a block diagram showing a configuration example of a speech classification apparatus to which the speech classification method described in Non-patent Document 1 has been applied. The speech classification apparatus shown in FIG. 6 includes a speech storage unit 801, an initialization unit 802, an inter-cluster distance calculation unit 803, a cluster pair integration unit 804, a stop determination unit 805, and a cluster storage unit 806.

The speech classification apparatus shown in FIG. 6 operates as follows. First, the initialization unit 802 collectively reads speech data (speech signal extracted to a finite length) stored in the speech storage unit 801, defines the number of clusters which is the same as the number of the speech data, and sets an initial assignment for classification where one speech belongs to one cluster. Specifically, a unique cluster ID is allocated to each speech data, calculates statistics (mean, variance, sufficient statistics, and the like) for each cluster using the speech data to which the same cluster ID has been allocated, and stores results of calculation in the cluster storage unit 806.

Next, the inter-cluster distance calculation unit 803 calculates a distance (difference level) between arbitrary two clusters, based on the statistics for each cluster stored in the cluster storage unit 806. Then, the cluster pair integration unit 804 selects the cluster pair having a minimum distance calculated by the inter-cluster distance calculation unit 803, and consolidates the cluster pair. Herein, the cluster ID of one cluster of the cluster pair to be consolidated is assigned to all speech data belonging to the other cluster. Then, statistics of the consolidated clusters are recalculated, using a speech data group to which the cluster ID has been allocated, and are stored in the cluster storage unit 806.

The stop determination unit 805 determines appropriateness of a current classified state (or whether or not cluster consolidation is further performed), based on a predetermined rule calculated from the statistics. That is, based on the predetermined rule derived from the current statistics for each cluster, the stop determination unit 805 determines whether or not to further perform cluster consolidation. When the stop determination unit 805 determines that cluster consolidation should not be performed (determines the current classified state to be appropriate), the stop determination unit outputs the current classified state as a final result of classification. On the other hand, when the stop determination unit 805 determines cluster consolidation should be further performed (determines that the current classified state not to be appropriate), each of the inter-cluster distance calculation unit 803 and the cluster pair integration unit 804 repeats the operation described above, based on the current classified state.

Such a classification method is referred to as a "shortest distance method". Further, as a data type of speech data (speech signal), a time series of feature vectors constituted from features that reflect a speaker or an environment, such as Mel-frequency cepstral coefficients (MFCC) often used in a speech recognition system, is employed.

As another related art of the speech classification method, a description in Non-patent Document 2 is referred to. FIG. 7 is a block diagram showing a configuration example of a speech classification apparatus to which the speech classification method described in Non-patent Document 2 has been applied. The speech classification apparatus shown in FIG. 7 includes a speech input unit 901, a speech-cluster distance calculation unit 902, a cluster number determination unit 903, a speech-cluster consolidation unit 904, and a cluster storage unit 905.

The speech classification apparatus shown in FIG. 7 operates as follows. First, the speech input unit 901 receives sequentially input speeches, and sequentially delivers the received speeches to the speech-cluster distance calculation unit 902. Upon reception of one speech data, the speech-cluster distance calculation unit 902 calculates statistics of the one speech data (such as mean, variance, and sufficient statistics). Further, the speech-cluster distance calculation unit 902 refers to the statistics of each of clusters already stored in the cluster storage unit 905, and calculates a distance (difference level) between the one speech data and each cluster. The cluster number determination unit 903 selects the cluster having a minimum one of distances between the input one speech data and the respective clusters. When the value of the distance is larger than a predetermined threshold value, the cluster number determination unit 903 determines the number of the clusters to be N+1. Otherwise, the cluster number determination unit 903 determines the number of the clusters to remain at N.

When the number of the clusters determined by the cluster number determination unit 903 is N+1, the speech-cluster consolidation unit 904 creates a new cluster having the input one speech data as a constituent, and stores statistics of the new cluster in the cluster storage unit 905. On the other hand, when the number of the clusters remains at N, the input one speech data is consolidated into the cluster that is selected by the cluster number determination unit 903 and has the minimum distance with the input one speech. The speech-cluster consolidation unit 904 recalculates statistics of this cluster, and stores the statistics in the cluster storage unit 905.

In the speech classification apparatus in this example, in a stage where no speech data is input, or in the stage where no cluster is present (N=0) in the cluster storage unit 905, the speech-cluster distance calculation unit 902 performs no particular processes, and the cluster number determination unit 903 determines the number of clusters to be N+1 (or 1). Then, the speech-cluster consolidation unit 904 creates the new cluster having input one speech data as the constituent and stores the new cluster in the cluster storage unit 905.

Patent Document 1 describes a speaker clustering processing apparatus in which clustering is performed with an algorithm adopted in a well known SPLIT method, using a distance between speakers. In this method, the distances between speakers are calculated for the entire combination of speakers in advance and then, with reference to the calculation results of the distances between speakers, division is executed from a cluster having a sum of the distances between speakers assuming the maximum value.

Patent Document 1:

JP Patent Kokai Publication No. JP-A-11-175090 (column 0026)

Non-Patent Document 1:

S. S. Chen, E. Eide, M. J. F. Gales, R. A. Gopinath, D. Kanvesky, and P. Olsen, "Automatic Transcription of Broadcast News", Speech Communication, 2002, Vol. 37, pp. 69-87

Non-Patent Document 2:

D. Liu and F. Kubala, "OnLine speaker clustering", Proc. International Conference on Acoustics, Speech, and Signal Processing (ICASSP), 2004, Vol. 1, pp. 333-386.

SUMMARY

The disclosures of the Patent Document 1 and Non-patent Documents 1 and 2 described above are incorporated herein by reference. Analyses of the related arts by the present invention will be given below.

A first problem is that the speech classification apparatuses and methods in the related arts are not suited to an application for which a real-time property is demanded. The reason for the first problem is as follows. In the classification as disclosed in Patent Document 1 and Non-patent Document 1 using the minimum distance method, all speech data targeted for the classification must be obtained to find a speech pair having a minimum distance, and then, distances between two arbitrary speech data must be calculated. That is, in such a method of calculating the distances between the two arbitrary speech data whenever one speech data is input, operation cannot be performed as an on-line process. Accordingly, this classification method is suited only to an off-line process (pre-process) on predetermined speech data.

A second problem is that a memory use amount and a process time become enormous when a large quantity of speeches is handled. The reason for the second problem is as follows. In the classification using the minimum distance method as disclosed in Patent document 1 and Non-patent Document 1, it is necessary to calculate and hold the distances between two arbitrary speech data from all speech data targeted for the classification. Accordingly, a memory region and a calculation time that are proportional to the square of the number of speeches are needed.

A third problem is that, since greedy and deterministic classification is performed, a classification error may readily occur, and the error tends to adversely affect subsequent classification. The reason for the third problem is as follows. The methods described in Patent document 1 and Non-patent Documents 1 and 2 adopt a greedy search strategy of consolidating a pair of clusters or speech data and a cluster, which are closest at a current point of time, in a stepwise manner. Thus, an overall group of speech data cannot be surveyed to find optimal classification.

A fourth problem is that, when speeches that are sequentially input on-line are classified, there is no simple means for reflecting a result of classification at a certain point of time on a preceding result of classification. The reason for the fourth problem is as follows. As described before, in the method described in Patent document 1 or Non-patent Document 2, deterministic classification is performed, and there is no mechanism that subsequently modifies a result of the classification. If a result of classification in the past is to be modified by the method described in Non-patent Document 2, almost the same method as that described in Non-patent Document 1 may be used, and the method is not suited to be carried out on-line.

A fifth problem is that accurate classification in view of the detailed structure of speech data cannot be performed. The reason for the fifth problem is as follows. In the methods described in Patent document 1 and Non-patent Documents 1 and 2, a single Gaussian distribution is assumed for the distribution of speech data in each cluster. Then, the cluster is represented by simple statistics such as mean and variance of feature vectors. When such a simple model is assumed for the distribution of the speech data, a detailed distribution structure at a subunit level (e.g. a phoneme such as a vowel or a consonant) cannot be handled. Accordingly, accuracy of classification is naturally limited.

With respect to the speaker clustering processing apparatus described in Patent Document 1, the process of creating the plural K clusters is a pre-process. Thus, no consideration is given to causing a clustering process which creates optimal clusters responsive to sequentially input speech data to operate as an on-line process.

Accordingly, it is an object of the present invention to provide a speech classification apparatus, a speech classification method, and a speech classification program that can be operated on-line and can be used for an application for which a real-time property is demanded.

Another object of the present invention is to allow classification of each speech with a realistic memory use amount and a realistic process time even if a lot of speeches must be handled. A further object of the present invention is to allow a classification error to be reduced to be low when each speech is classified. Another object of the present invention is to allow verification of a result of classification in the past and modification of a classification error when speeches sequentially input on-line are classified. Still another object of the present invention is to allow more accurate classification of speeches in view of detailed structures of the speeches.

According to the present invention, there is provided a speech classification apparatus that classifies speech signals into clusters based on vocal similarity. The speech classification apparatus includes:

a speech classification probability calculation unit that calculates a probability that a latest input one of the speech signals sequentially input belongs to each of the clusters, based on a probability model for probabilistically determining to which cluster a certain speech signal belongs; and a parameter updating unit that successively estimates values of parameters that define the probability model using each probability calculated by the speech classification probability calculation unit;

the speech classification probability calculation unit calculating each probability based on the probability model defined by latest values of the parameters successively estimated by the parameter updating unit.

According to the present invention, there is provided a speech classification method that classifies speech signals into clusters based on vocal similarity. The speech classification method includes:

calculating a probability that a latest input one of the speech signals sequentially input belongs to each cluster, based on a probability model for probabilistically determining to which cluster a certain speech signal belongs;

successively estimating parameters that define the probability model using the probability; and calculating a probability that at least next one of the input speech signals belongs to each cluster, based on the probability model defined by the successively estimated parameters.

According to the present invention, there is provided a computer-readable recording medium storing a speech classification program for classifying speech signals into clusters based on vocal similarity. The program causes a computer to execute:

a probability calculation processing that calculates a probability that a latest input one of the speech signals sequentially input belongs to each cluster, based on a probability model for probabilistically determining to which cluster a certain speech signal belongs; and a parameter update processing that successively estimates parameters that define the probability model using each probability calculated by the speech classification probability calculation processing;

the probability calculation processing calculating each probability based on the probability model defined by latest values of the successively estimated parameters.

The present invention can be operated on-line and can be used for an application for which a real time property is demanded.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 3 is an explanatory diagram showing an example of a data structure of speaker data stored in speaker data storage means 102;

PREFERRED MODES

Figure 1:
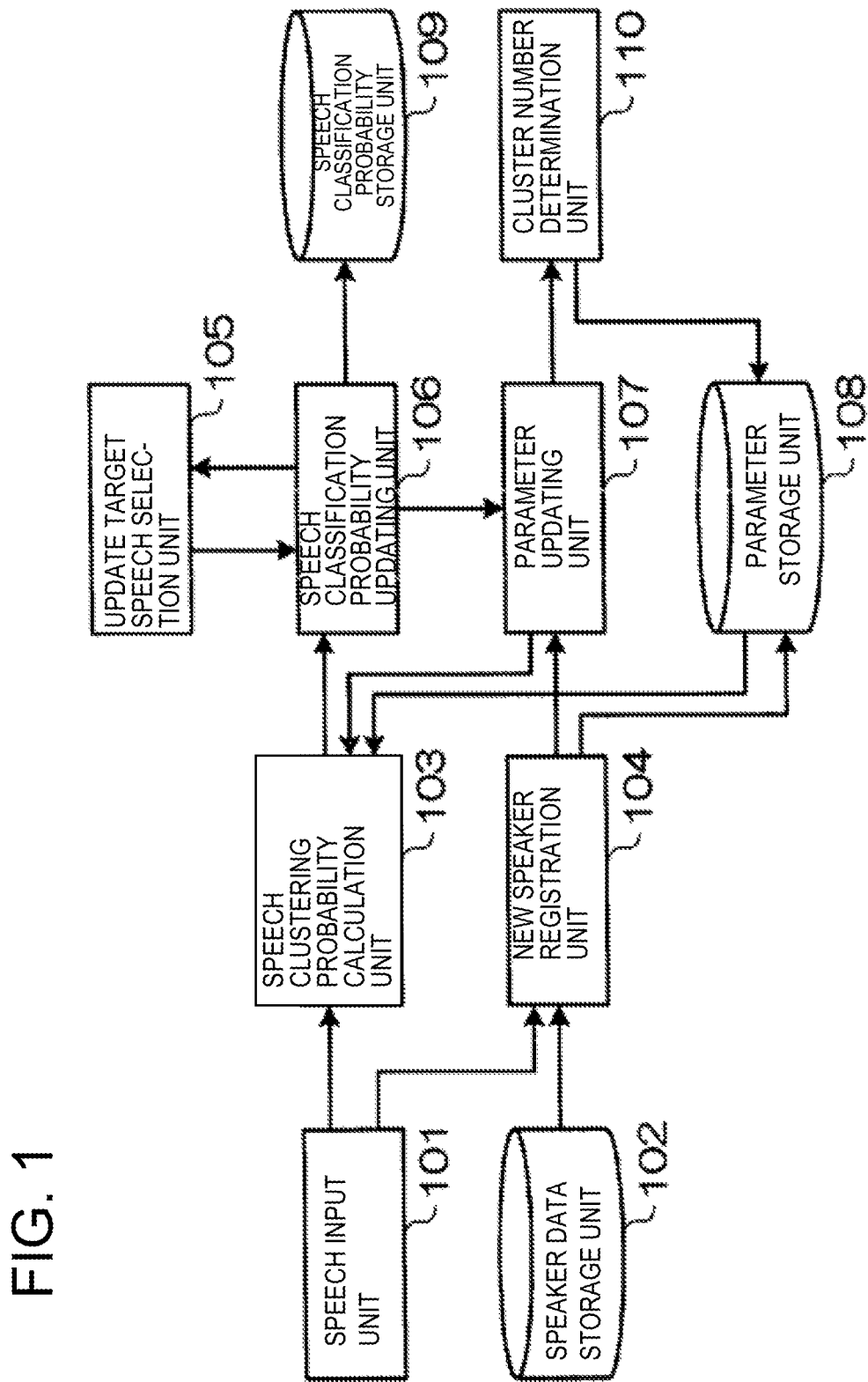
FIG. 1 is a block diagram showing a configuration example of a speech classification apparatus according to a first exemplary embodiment.

Exemplary embodiments of the present invention will be described. According to one mode of the present invention, there is provided a speech classification apparatus that classifies speech signals into clusters based on vocal similarity. This speech classification apparatus includes:

a speech classification probability calculation unit (such as speech classification probability calculation unit 103) for calculating a probability that a latest input one of the speech signals sequentially input belongs to each cluster, based on a probability model for probabilistically determining to which cluster a certain speech signal belongs; and a parameter updating unit (such as parameter updating unit 107) for successively estimating parameters that define the probability model using each probability calculated by the speech classification probability calculation unit. The speech classification probability calculation unit calculates each probability based on the probability model defined by latest values of the parameters successively estimated by the parameter updating unit. With this arrangement, the speech classification apparatus of the present invention can be operated on-line, and can also be used for an application for which a real-time property is demanded. Further, the present invention allows each speech to be classified using a realistic memory use amount and a realistic process time, even in a situation where a lot of speech data must be handled. The present invention further allows a classification error to be reduced to be low when each speech is classified. Then, the present invention aims to allow verification of a classification result in the past and modification of a classification error when sequentially input speeches are classified on-line. The present invention further allows more accurate classification of speeches in view of detailed structures of the speeches.

The speech classification apparatus according another mode of the present invention may include:

a speech classification probability updating unit (such as speech classification probability updating unit 106) for recalculating probabilities that the speech signals which have been input within predetermined times in the past belong to the respective clusters, based on the probability model defined by the latest values of the parameters successively estimated by the parameter updating unit. The parameter updating unit may estimate the parameters that define the probability model using each of the probabilities calculated by the speech classification probability updating unit.

The speech classification apparatus according to still another mode of the present invention may include:

a new cluster registration unit (such as new speaker registration unit 104) for generating a probability model that defines a new cluster to which the input speech signal belongs, assuming a case where the input speech signal does not belong to any cluster; and a cluster number determination unit (such as cluster number determination unit 110) for determining whether or not to add the new cluster from a result of parameter estimation by the parameter updating unit based on a result of calculation using the probability model generated by the new cluster registration unit.

In the speech classification apparatus according to the present invention, the probability model may be a hidden Markov model in which states are in a one-to-one correspondence with the clusters.

In the speech classification apparatus according to the present invention, the probability model may be the hidden Markov model associated with a Gaussian mixture distribution having the number of mixtures corresponding to the number of types of phonemes.

The speech classification apparatus according to still another mode of the present invention is the speech classification apparatus including speech classification probability updating unit (such as the speech classification probability updating unit 106) for recalculating the probabilities that the speech signals which have been input within the predetermined times in the past belong to the respective clusters, based on the probability model defined by the latest values of the parameters successively estimated by the parameter updating unit. The speech classification apparatus may include:

a update target speech selection unit (such as update target speech selection unit 105) for determining whether or not to cause the speech classification probability updating unit to recalculate a probability that each of the speech signals input within the predetermined times in the past belongs to each cluster.

In the speech classification apparatus according to the present invention, the update target speech selection unit may determine whether or not recalculation of the probability that each of the speech signals belongs to each cluster is needed, based on an entropy of the calculated probability that each of the speech signals belongs to each cluster at a time of the determination as to the recalculation.

In the speech classification apparatus according to the present invention, when the speech signal where the cluster to which the speech signal should belong is known is provided in advance, the new cluster registration unit may generate a probability model that defines the cluster to which the speech signal should belong.

A speech classification method according to the present invention is the speech classification method that classifies speech signals into clusters based on vocal similarity. The method includes the steps of:

calculating a probability that a latest input one of the speech signals sequentially input belongs to each cluster, based on a probability model for probabilistically determining to which cluster a certain speech signal belongs;

successively estimating parameters that define the probability model using the probability; and calculating a probability that at least next one of the input speech signals belongs to each cluster, based on the probability model defined by the successively estimated parameters.

In the speech classification method according to the present invention, probabilities that the speech signals which have been input within predetermined times in the past belong to the respective clusters may be recalculated, based on the probability model defined by the latest values of the successively estimated parameters; and the parameters that define the probability model may be estimated using each of the recalculated probabilities.

In the speech classification method according to the present invention, a probability model that defines a new cluster to which the input speech signal belongs may be generated, assuming a case where the input speech signal does not belong to any cluster; and it may be determined whether or not to add the new cluster from a result of parameter estimation by the parameter updating unit based on a result of calculation using the generated probability model.

In the speech classification method according to the present invention, the probability model may be a hidden Markov model in which states are in a one-to-one correspondence with the clusters.

In the speech classification method according to the present invention, the probability model may be the hidden Markov model associated with a Gaussian mixture distribution having the number of mixtures corresponding to the number of types of phonemes.

In the speech classification method according to the present invention, it may be determined whether or not to need recalculation of a probability that each of the speech signals input within the predetermined times in the past belongs to each cluster.

In the speech classification method according to the present invention, it may be determined whether or not to need recalculation of the probability that each of the speech signals belongs to each cluster, based on an entropy of the calculated probability that each of the speech signals belongs to each cluster at a time of the determination as to the recalculation.

In the speech classification method according to the present invention, a probability model that defines the cluster to which the speech signal should belong may be generated, when the speech signal where the cluster to which the speech signal should belong is known is provided in advance.

A speech classification program according to the present invention is the speech classification program for classifying speech signals into clusters based on vocal similarity. The program causes a computer to execute:

a probability calculation processing that calculates a probability that a latest input one of the speech signals sequentially input belongs to each cluster, based on a probability model for probabilistically determining to which cluster a certain speech signal belongs; and a parameter updating processing that successively estimates parameters that define the probability model using each probability calculated by the speech classification probability calculation process. In the probability calculation process, each probability is calculated based on the probability model defined by latest values of the successively estimated parameters.

The speech classification program according to the present invention may cause the computer to execute:

a probability recalculation processing that recalculates probabilities that the speech signals which have been input within predetermined times in the past belong to the respective clusters, based on the probability model defined by the latest values of the successively estimated parameters. In the parameter updating process, the parameters that define the probability model may be successively estimated using each of the probabilities calculated by the probability recalculation process.

The speech classification program according to the present invention may cause the computer to execute the processing comprising:

generating a probability model that defines a new cluster to which the input speech signal belongs, assuming a case where the input speech signal does not belong to any cluster; and determining whether or not to add the new cluster from a result of parameter estimation based on a result of calculation using the probability model that defines the new cluster.

In the speech classification program according to the present invention, the probability model may be a hidden Markov model in which states are in a one-to-one correspondence with the clusters.

In the speech classification program according to the present invention, the probability model may be the hidden Markov model associated with a Gaussian mixture distribution having the number of mixtures corresponding to the number of types of phonemes.

The speech classification program according to the present invention may cause the computer to execute:

a determination processing that determines whether or not to need recalculation of a probability that each of the speech signals input within the predetermined times in the past belongs to each cluster.

In the determination process of the speech classification program according to the present invention, it may be determined whether or not to need recalculation of the probability that each of the speech signals belongs to each cluster, based on an entropy of the calculated probability that each of the speech signals belongs to each cluster at a time of the determination as to the recalculation.

The speech classification program according to the present invention may cause the computer to execute the processing comprising:

generating a probability model that defines the cluster to which the speech signal should belong when the speech signal where the cluster to which the speech data should belong is known is provided in advance.

Effects of the present invention in the above exemplary embodiments will be described below.

A first effect is that an on-line operation in which sequentially input speech data are classified one after another can be performed. The reason for the first effect is that the speech classification probability calculation unit clusters speech data based on the parameters that define the generative model of a speech and that the parameter updating unit updates the parameters one after another based on a result of classification of the speech data.

A second effect is that even if a lot of speech data is input, the speech data can be classified using a realistic memory use amount and a realistic process time. The reason for the second effect is that the speech classification probability unit and the speech classification probability updating unit classify only a latest predetermined number of the speech data, and that the parameter updating unit updates the parameters using only a result of classification of the predetermined number of the speech data.

A third effect is that a classification error caused by a search error can be reduced to be low. The reason for the third effect is that the speech classification probability calculation unit and the speech classification probability updating unit calculate an extensively optimal classification result probabilistically rather than discretely, based on the generative model of a speech rather than a local criterion such as a minimum distance.

A fourth effect is that a classification error can be modified by verifying a classification result in the past in the on-line operation. The reason for the fourth reason is that the speech classification probability updating unit reclassifies the predetermined number of speech data input in the past and classified, based on latest values of the parameters determined by the parameter updating unit.

A fifth effect is that a classification error caused by complexity of a speech internal structure can be reduced to be low. The reason for the fifth effect is that, by modeling a speech issued by a speaker (or in an environment) using a complex model such as a Gaussian mixture distribution rather than a simple model such as a single Gaussian distribution, a speaker (environment) difference can be expressed at a detailed level such as phonemes.

Exemplary embodiments of the present invention will be described below with reference to drawings. FIG. 1 is a block diagram showing a configuration example of a speech classification apparatus according to a first exemplary embodiment. The speech classification apparatus shown in FIG. 1 includes a speech input unit 101, a speaker data storage unit 102, a speech classification probability calculation unit 103, a new speaker registration unit 104, an update target speech selection unit 105, a speech classification probability updating unit 106, a parameter updating unit 107, a parameter storage unit 108, a speech classification probability storage unit 109, and a cluster number determination unit 110.

In this exemplary embodiment, the speech classification apparatus for classifying speeches for each speaker, based on vocal similarity is illustrated. The present invention can be applied not only to classifying for each speaker but also to a use where speech signals are classified based on similarity of certain features of the speech signals. The classification of the speech signals includes classification of speeches of a same speaker based on similarity of noises superimposed on a background, and classification of the speeches of the same speaker based on similarity of communication lines or acoustic apparatuses (such as vocal microphones or cellular phones) to be used.

The speech input unit 101 receives speech data. The speech data is herein defined as a speech signal which has been extracted to a finite length, and which constitutes a unit data of the input speech signal supplied to this speech classification apparatus. The speech data does not necessarily need to be the speech signal extracted to a same length. The speech input unit 101 may extract a feature or a set (vector) of features necessary for classification using acoustic analysis unit not shown, when the speech input unit 101 receives the speech data supplied from outside. As the feature, feature parameters such as power, Mel-frequency cepstral coefficients (MFCCs), and derivatives of the power and the Mel-frequency cepstral coefficients may be extracted in the form of a feature vector time series. An individual feature vector is generally referred to as a frame. The feature may be the original speech signal (speech data) itself. The speech input unit 101 may include a function of dividing the input speech signal into the speech data by segmenting the speech signal according to a predetermined condition (volume or time) when the speech signal is continuously supplied.

When speech data of known speakers can be obtained in advance, the speaker data storage unit 102 stores those speech data as speaker data associated with the respective speakers. The speaker data storage unit 102 associates and stores a unique ID assigned to each speaker (hereinafter referred to as a speaker ID) with the speech data (or feature) of the speaker. When a speech uttered by a same speaker in a different environment is classified as a different speech, the speaker data storage unit 102 may store speech data for each combination of a known speaker and an environment. That is, the speaker data storage unit 102 may associate speech data (or feature of the speech data) where a cluster into which the speech data is classified is known in advance with a unique cluster ID for identifying the cluster, and may store the speech data and the unique cluster ID.

Herein, the cluster is defined to be the cluster in a clustering analysis, which is one of data analysis approaches. Specifically, the cluster is defined to be each subset when a plurality of data (herein a plurality of speech data) is classified into subsets based on similarity of features of the plurality of data.

The speech classification probability calculation unit 103 calculates to which clusters sequentially input speech data belong in the form of probabilities, based on parameter values stored in the parameter storage unit 108, thereby sequentially classifying the speech data. Specifically, the speech classification probability calculation unit 103 derives a probability that the input speech data belongs to each cluster, using a generative model which is a probability model defined by the parameter values at a current time stored in the parameter storage unit 108 and which assumes a speech data distribution, to determine to which cluster the speech data belongs. Generally, the generative model is a model that mathematically describes a data generation mechanism considered to be present in the background of monitored data. Herein in particular, the generative model is the model (information) that defines an arithmetic expression or a computational condition for probabilistically determining to which cluster a certain speech signal (speech data) belongs. Specifically, the generative model is the information indicating an arithmetic expression or computational condition for determining a probability that the certain speech data belongs to each cluster. A specific example of the generative model will be described later.

The new speaker registration unit 104 performs registration of a new cluster, assuming that a speech uttered by a new speaker has been input. The new speaker registration unit 104 generates a probability model corresponding to addition of the new cluster, assuming that the input speech data does not belong to any existent cluster. The cluster number determining unit 110 determines whether or not to fix the new cluster. When speaker data (speech data for each known speaker) is registered in the speaker data storage unit 102, the new speaker registration unit 104 estimates parameters of the generative model from the speech data for each speaker represented by the speaker data and classified as one cluster for each speaker, and stores the parameters in the parameter storage unit 108.

The update target speech selection unit 105 determines the degree of possibility that each of the speech data of a predetermined number input in the past moves to a different cluster by reclassification, or determines whether or not calculation of the reclassification can be omitted. Then, the update target speech selection unit 105 notifies a result of the determination to the speech classification probability updating unit 106. That is, the update target speech selection unit 105 selects speech data targeted for reclassification by the speech classification probability updating unit 106.

The speech classification probability updating unit 106 calculates to which clusters the respective speech data input in the past belongs in the form of probabilities, using the parameter values stored in the parameter storage unit 108, thereby reclassifying the speech data which was classified in the past. The speech classification probability updating unit 106 may perform reclassification of only the speech data selected by the update target speech selection unit 105.

The parameter updating unit 107 successively updates the model parameters that define the generative model which assumes distribution of the input speech data. Based on results of classification by the speech classification probability calculation unit 103 and the speech classification probability updating unit 106, the parameter updating unit 107 assumes the current number of clusters and some numbers of clusters in the vicinity of the current number of clusters, calculates a sufficient statistic necessary for briefly calculating the generative model, and further estimates parameter values of the generative model, for each of the number of clusters.

The parameter storage unit 108 stores the parameter values and sufficient statistics of the generative model corresponding to the current number of clusters. The number of clusters may also be stored in the parameter storage unit 108.

The speech classification probability storage unit 109 stores results of classification (specifically, classification probabilities into the respective clusters) by the speech classification probability calculation unit 103 and the speech classification probability updating unit 106. The speech classification probability storage unit 109 stores a new classification result calculated by the speech classification probability calculation unit 103 and overwrites a classification result obtained by reclassification calculated by the speech classification probability updating unit 106 onto the classification result hitherto obtained. The speech classification probability storage unit 109 may also store a result of classification when a new cluster registered by the new speaker registration unit 104 is included.

The cluster number determination unit 110 estimates the optimal number of clusters (herein the number of speakers) up to the latest input speech data. The cluster number determination unit 110 determines the optimal number of clusters among the some number of clusters assumed by the parameter updating unit 107 based on a result of estimation of the parameter values of the generative model by the parameter updating unit 107. The cluster number determination unit 110 stores sufficient statistics and parameter values corresponding to the determined number of clusters in the parameter storage unit 108.

Figure 2:
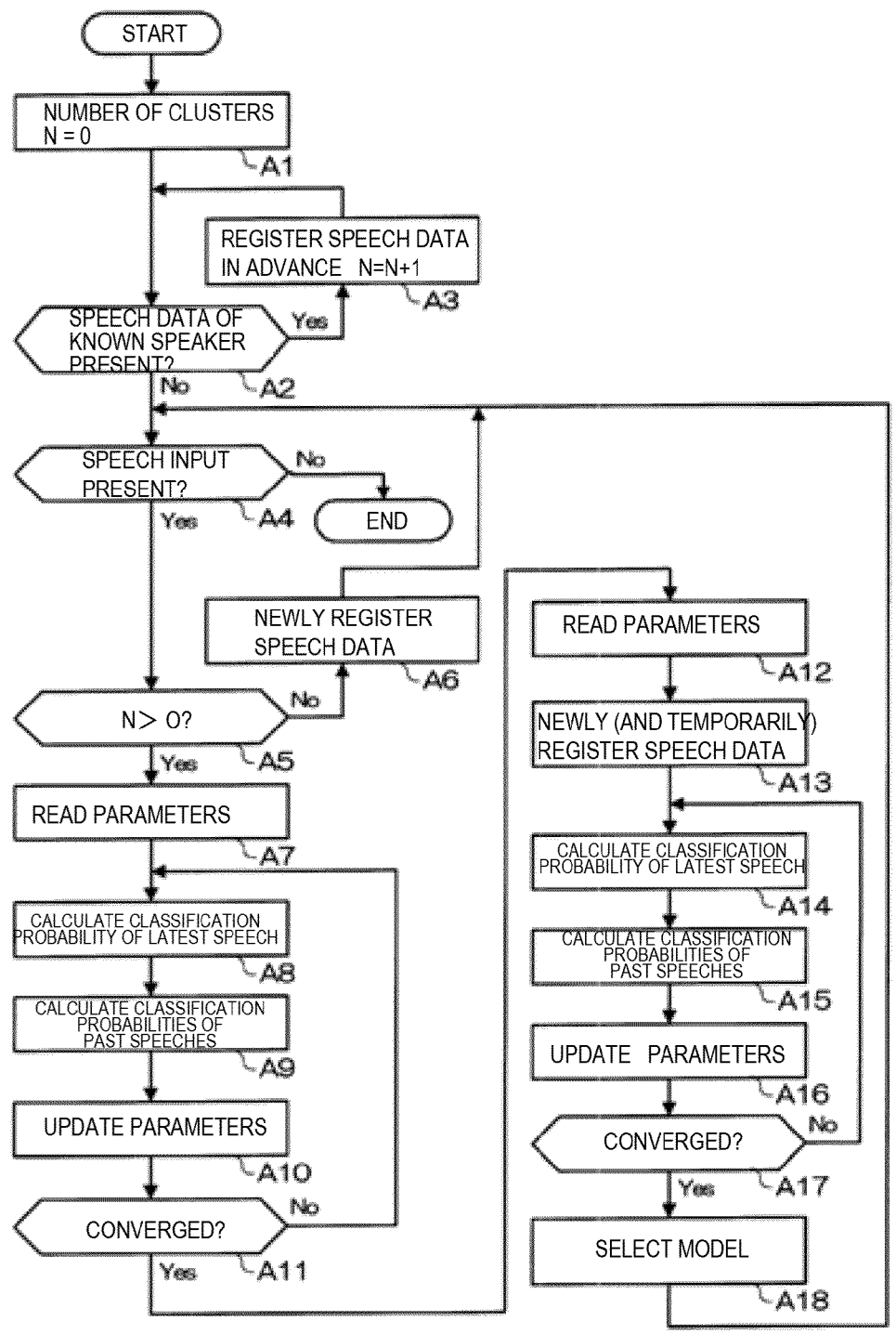
FIG. 2 is a flowchart showing an operation example of the speech classification apparatus according to the first exemplary embodiment.

Next, an operation of this exemplary embodiment will be described. FIG. 2 is a flowchart showing an operation example of the speech classification apparatus according to this exemplary embodiment. As shown in FIG. 2, initially, the speech classification apparatus initializes respective storage regions in the parameter storage unit 108 and the speech classification probability storage unit 109, and sets a number of clusters N to 0 (in step A1). Next, the new speaker registration unit 104 checks whether or not speaker data (speech data associated with a speaker) is stored in the speaker data storage unit 102 (in step A2). When the speaker data is stored, the new speaker registration unit 104 registers a new cluster corresponding to a feature obtained from the speech data of the speaker, using one cluster for each speech data of one speaker (in step A3). The new speaker registration unit 104 increments 1 to the number of clusters N for each speaker, and generates a generative model in which speech data of each speaker belongs to the cluster corresponding to the speaker, based on the speech data of each speaker. Specifically, the new cluster in the generative model is defined. Then, a sufficient statistic is obtained from the speech data of the speaker corresponding to the new cluster, and values of parameters by which the speech data of the speaker belongs to the new cluster are estimated, thereby generating (fixing) the generative model in which the number of clusters equals to the number of the speakers. Then, the parameter values estimated together with the sufficient statistic are stored in the parameter storage unit 108.

FIG. 3 is an explanatory diagram showing an example of a data structure of speaker data stored in the speaker data storage unit 102. As shown in FIG. 3, a speaker ID assigned for each known speaker, speech data (or the feature) of the speaker, and the number of speeches may be associated with one another and stored in the speaker data storage unit 102, for example. Herein, $X_{i,j}$ denotes speech data when a speaker whose speaker ID is i utters a speech in a jth time. The speech data $X_{i,j}$ is a time series of feature vectors $x_{i,j,t}$ such as $X_{i,j}=(x_{i,j,1}, x_{i,j,2}, \ldots, x_{i,j,T})$. The parameters and sufficient statistics of the generative model will be described later.

Next, the speech input unit 101 sequentially receives input speech data, and converts the input speech data to a feature vector series by acoustic analysis unit. When there remains no input speech data, the operation is finished (in step A4). When the number of clusters N is 0 at a time of input of the speech data (No in step A5), the new speaker registration unit 104 registers a new cluster for the speech data (in step A6). That is, when no data is registered in the speaker data storage unit 102 and when initial speech data is input to the speech input unit 101, the initial speech data is sent to the new speaker registration unit 104. Then, the new speaker registration unit 104 sets the number of clusters N to 1. The new speaker registration unit 104 obtains a sufficient statistic from the input speech data and estimates parameter values by which the speech data belongs to the new cluster, using the same process as in step A3, thereby generating a generative model in which the number of clusters N is 1. Then, the parameter values estimated together with the sufficient statistic are stored in the parameter storage unit 108.

When the number of clusters N is equal to or more than 1 (Yes in step A5), the speech classification probability calculation unit 103 reads parameters and sufficient statistics of the generative model stored in the parameter storage unit 108 (in step A7). Then, the speech classification probability calculation unit 103 calculates to which cluster the input speech data (one speech data) belongs in the form of a probability (in step A8).

Figure 4:
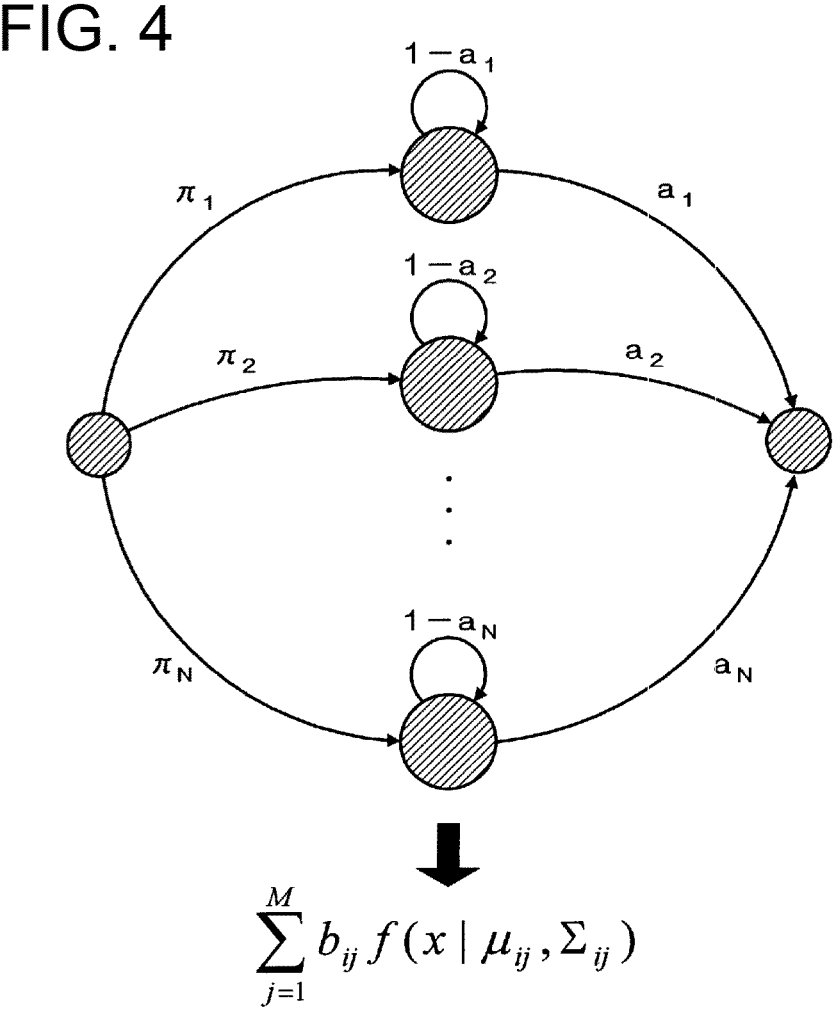
FIG. 4 is an explanatory diagram showing a graph structure of a generative model.

Herein, the generative model used in this exemplary embodiment will be described. In this exemplary embodiment, the probability model referred to as a hidden Markov model having a graph structure as shown in FIG. 4 is used. FIG. 4 is an explanatory diagram showing the graph structure of the generative model in this exemplary embodiment. Vertically arranged nodes in a graph central portion are referred to as states. In this exemplary embodiment, one state corresponds to one cluster. In this model, transition is first made from an initial assignment at a left end to one of the states in the central portion. Then, some self transitions in that state are repeated. Finally, transition is made to a final state at a right end. The operation is thereby finished. Whenever one transition including a self transition is made in the central state, a feature vector x is output according to a predetermined probability distribution (such as a Gaussian mixture distribution).

Parameters in the model (HMM) mentioned above are $\pi_i$, $a_i$, $b_{ij}$, $\mu_{ij}$, $\Sigma_{ij}$ (i=1, . . . , N; j=1, . . . , M), in which N indicates the number of states of the HMM, and matches the number of clusters in this exemplary embodiment. M indicates the number of mixtures in the Gaussian mixture distribution, and may be set to the number of phonemes, for example. When the number of phonemes is used as the number of mixtures and the number of mixtures is too large, the number of types of phonemes, in each of which the phonemes with a similar distribution structure are brought together, may be used. The number of mixtures may be provided as the number of vowels and the number of consonants, or the number of vowels and the number of types of consonants such as plosive sounds, frictional sounds, and nasal sounds, for example. In this exemplary embodiment, the number of mixtures is set to be constant irrespective the states. The number of mixtures, however, may also be set to be different for each state.

$\pi_i$ indicates a transition probability from an initial assignment) to a state i. That is, $\pi_i$ indicates the probability of occurrence of speech data that belongs to a cluster i. $a_i$ indicates a transition probability from the state i to a final state, and corresponds to the average number of successive frames in one speech data. $b_{ij}$ indicates a weighting coefficient for a jth Gaussian distribution in distributions (mixtures of Gaussian distributions) of feature vectors output from the state i. $\mu_{ij}$ and $\Sigma_{ij}$ respectively indicate a mean vector and a variance covariance matrix of the jth Gaussian distribution. $f(x|\mu, \Sigma)$ is a Gaussian distribution (normal distribution); $\mu$ indicates a mean vector and $\Sigma$ indicates a variance-covariance matrix. Generally, the parameters can be estimated from n feature vector series (or n speech data). As a method of estimation, maximum likelihood estimation, maximum a posteriori (MAP) estimation, Bayesian estimation, or the like may be considered. In the case of the maximum likelihood estimation, for example, parameter estimation can be made using iterative solution of expressions (1), (2), and (3) referred to as an expectation maximization (EM) method.

$$\gamma_{ki} \leftarrow \frac{\pi_i (1-a_i)^{T_k-1} a_i \prod_{t=1}^{T_k} \sum_{j=1}^{M} f(x_{kt}|\mu_{ij}, \Sigma_{ij})}{\sum_{i'=1}^{N} \pi_{i'} (1-a_{i'})^{T_k-1} a_{i'} \prod_{t=1}^{T_k} \sum_{j=1}^{M} f(x_{kt}|\mu_{i'j}, \Sigma_{i'j})},$$

$$\zeta_{kijt} \leftarrow \gamma_{ki} \frac{f(x_{kt}|\mu_{ij}, \Sigma_{ij})}{\sum_{j=1}^{M} f(x_{kt}|\mu_{i'j}, \Sigma_{i'j})},$$

where, $k = n$, $i = 1, \ldots, N$, $j = 1, \ldots, M$ [Expression 1]

$$S_i^{(00)} \leftarrow \sum_{k=1}^{n} \gamma_{ki},\ S_i^{(01)} \leftarrow \sum_{k=1}^{n} T_k \gamma_{ki},\ S_{ij}^{(10)} \leftarrow \sum_{k=1}^{n} \sum_{t=1}^{T_k} \zeta_{kijt},$$

$$S_{ij}^{(11)} \leftarrow \sum_{k=1}^{n} \sum_{t=1}^{T_k} \zeta_{kijt} x_{kt},\ S_{ij}^{(12)} \leftarrow \sum_{k=1}^{n} \sum_{t=1}^{T_k} \zeta_{kijt} x_{kt} x_{kt}^T,$$

where, $i = 1, \ldots, N$, $j = 1, \ldots, M$ [Expression 2]

$$\pi_i \leftarrow \frac{1}{n} S_i^{(00)},\ a_i \leftarrow \frac{S_i^{(00)}}{S_i^{(01)}},\ b_{ij} \leftarrow \frac{S_{ij}^{(10)}}{\sum_{j'=1}^{M} S_{ij'}^{(10)}},\ \mu_{ij} \leftarrow \frac{S_{ij}^{(11)}}{S_{ij}^{(10)}},$$

$$\Sigma_{ij} \leftarrow \frac{S_{ij}^{(12)}}{S_{ij}^{(10)}},$$

where, $i = 1, \ldots, N$, $j = 1, \ldots, M$ [Expression 3]

in which $T_k$ indicates the number of successive frames of kth speech data, and $x_{kt}$ indicates a feature vector of a t-th frame of kth input speech data. $\gamma_{ki}$ in a first formula in Expression (1) in particular indicates a probability that the kth input speech data belongs to the state i, or the probability that the kth speech data belongs to the cluster i. Expressions (1) and (3) are respectively referred to as an E step and an M step in the EM method. Each amount in Expression (2) is a sufficient statistic on the model used in this exemplary embodiment.

The iterative solution of the above Expressions (1) to (3) is derived by modifying an off-line (batch) process, which is not aimed at by the present invention. In this exemplary embodiment, speech data from initial speech data $X_1$ to latest speech data $X_n$ are separately handled as the data $X_1, \ldots,$ and $X_{n-\delta}$ and the data $X_{n-\delta+1}, \ldots,$ and $X_n$. Then, by performing iterative solution using Expression (5) and Expression (3) described above, an on-line process can be performed.

$$\gamma_{ki} \leftarrow \frac{\pi_i (1-a_i)^{T_k-1} a_i \prod_{t=1}^{T_k} \sum_{j=1}^{M} f(x_{kt}|\mu_{ij}, \Sigma_{ij})}{\sum_{i'=1}^{N} \pi_{i'} (1-a_{i'})^{T_k-1} a_{i'} \prod_{t=1}^{T_k} \sum_{j=1}^{M} f(x_{kt}|\mu_{i'j}, \Sigma_{i'j})},$$

$$\zeta_{kijt} \leftarrow \gamma_{ki} \frac{f(x_{kt}|\mu_{ij}, \Sigma_{ij})}{\sum_{j=1}^{M} f(x_{kt}|\mu_{i'j}, \Sigma_{i'j})},$$

where, $k = n - \delta + 1, \ldots, N$, $i = 1, \ldots, N$, $j = 1, \ldots, M$ [Expression 4]

-continued $$S_i^{(00)} \leftarrow \overline{S}_i^{(00)} + \sum_{k=1}^{n-\delta} \gamma_{ki} + \sum_{k=n-\delta+1}^{n} \gamma_{ki},$$ [Expression 5]

$$S_i^{(01)} \leftarrow \overline{S}_i^{(01)} + \sum_{k=1}^{n-\delta} T_k \gamma_{ki} + \sum_{k=n-\delta+1}^{n} T_k \gamma_{ki},$$

$$S_{ji}^{(10)} \leftarrow \overline{S}_{ij}^{(10)} + \sum_{k=1}^{n-\delta} \sum_{t=1}^{T_k} \zeta_{kijt} + \sum_{k=n-\delta+1}^{n} \sum_{t=1}^{T_k} \zeta_{kijt},$$

$$S_{ji}^{(11)} \leftarrow \overline{S}_{ij}^{(11)} + \sum_{k=1}^{n-\delta} \sum_{t=1}^{T_k} \zeta_{kijt} x_{kt} + \sum_{k=n-\delta+1}^{n} \sum_{t=1}^{T_k} \zeta_{kijt} x_{kt},$$

$$S_{ji}^{(12)} \leftarrow \overline{S}_{ij}^{(12)} + \sum_{k=1}^{n-\delta} \sum_{t=1}^{T_k} \zeta_{kijt} x_{kt} x_{kt}^T + \sum_{k=n-\delta+1}^{n} \sum_{t=1}^{T_k} \zeta_{kijt} x_{kt} x_{kt}^T,$$

where, $i = 1, \ldots, N$,
$j = 1, \ldots, M$

Computation formulas of Expression (4) are the same as those in Expression (1). However, the Expression (4) is different from Expression (1) in that a computation range is extended to recently input $\delta$ speech data ($k=n-\delta+1, \ldots, n$). Each sufficient statistic in Expression (5) is computed as a sum of three terms. Herein, a first term is a sufficient statistic calculated from speech data of known speakers stored in the speaker data storage unit 102, and is a constant that is not needed to be updated even if the number of subsequently input speech data is increased. A second term is a sufficient statistic on speech data older than the recent $\delta$ speech data and is an amount that is not updated by Expression (4). Whenever one speech data is input, a term with respect to $(n-\delta+1)$th speech data (which has been already computed at a time of input of immediately preceding speech data $X_{n-1}$) is added. A third term is an amount that is successively updated using a result of Expression (4).

The parameter estimation method described above is a variant of the generalized EM (GEM) method. It can be mathematically proved that likelihood maximization, which is the object of maximum likelihood estimation, is compensated for at least in the form of a monotonic non-decrease of a likelihood.

In the MAP estimation, by setting parameters about a parameter prior distribution in advance, parameter re-estimation expressions based on an iterative solution similar to the above-mentioned Expressions (1), (2), and (3) can be derived. Further, by setting hyper-parameters about a prior distribution in the Bayesian estimation as well, hyper-parameter re-estimation expressions of a posterior distribution similar to the above-mentioned Expressions (1), (2), and (3) can be derived. Details of the derivation are disclosed in a literature by H. Attias, "Inferring parameters and structure of latent variable models by variational Bayes.", Proc. 15th Conf. on Uncertainty in Artificial Intelligence, 1999.

The speech classification probability calculation unit 103 performs calculation using the above-mentioned Expression (4) on latest speech data ($k=n$), determines the probability $\gamma_{ki}$ that the speech data belongs to the cluster i ($i=1$ to N), and stores results of the determinations in the speech classification probability storage unit 109, in step A8. In step A9, the speech classification probability updating unit 106 performs calculation using the above-mentioned Expression (4) on $(\delta-1)$ speech data other than the latest speech ($k=n$), determines the probability $\gamma_{ki}$ ($k=n-\delta+1, \ldots, n-1$) that each of the speech data (($\delta-1$) speech data other than the latest speech data) belongs to the cluster i, and reflects (overwrites) results of the determinations onto the speech classification probability storage unit 109. However, the update target speech selection unit 105 determines whether or not to need recalculation before these calculations. Then, the speech classification probability updating unit 106 performs recalculation only on the speech data determined to need the recalculation.

An indicator when the update target speech selection unit 105 determines whether or not to need recalculation can be defined as $\gamma_{ki} \times \log \gamma_{ki}$, for example. This indicator is obtained by reversing the sign of an entropy of the probability that the speech data belongs to the cluster. When the probability that the speech data belongs to a specific cluster is high, the value of the indicator is increased. On the contrary, when the probabilities about a lot of clusters are constant, the value of the indicator is reduced. In other words, when speech data is located in the vicinity of the center of the cluster, the value of the indicator is increased. When speech data is located in the vicinity of a boundary among a plurality of clusters, the value of the indicator is reduced. Accordingly, by performing calculation only on speech data for which this indicator is lower than a predetermined threshold value, or only on speech data for which a cluster that the speech data belongs to is not determined, reclassification can be efficiently performed.

Next, the parameter updating unit 107 updates the parameters using Expressions (5) and (3), based on results of the calculations by the speech classification probability calculation unit 103 and the speech classification probability updating unit 106 (in step A10). Processes in steps A8 to A10 may be repeated a plurality of times while making an appropriate convergence determination (in step A11).

Next, the new speaker registration unit 104 reads the parameters and sufficient statistics of the generative model stored in the parameter storage unit 108 (in step A12), and generates a generative model when the number of clusters is increased to N+1, using the same process as in step A6 (in step A13). The new speaker registration unit 104 adds a new cluster, assuming that the input speech data does not belong to any cluster. The new speaker registration unit 104 determines the sufficient statistic of the speech data, and estimates parameter values by which the speech data belongs to the new cluster. The new speaker registration unit thereby generates the generative model when the number of clusters is increased to N+1.

Next, the speech classification probability calculation unit 103 reads parameters and sufficient statistics of the generative model estimated by the new speaker registration unit 104, and calculates a probability that latest input speech data (or nth speech data) belongs to each cluster including the new cluster (in step A14), using the same process as in step A8. The speech classification probability updating unit 106 recalculates a probability that each of the ($\delta-1$) speech data immediately preceding the nth speech data excluding the nth speech data (($\delta-1$) speech data except the latest data) belongs to each cluster including the new cluster, using the same process as in step A10 (in step A15). Then, the parameter updating unit 107 updates the parameters, based on results of calculations by the speech classification probability calculation unit 103 and the speech classification probability updating unit 106 (in step A16). Incidentally, the processes in steps A14 to A16 may be repeated a plurality of times, while making an appropriate convergence determination (in step A17).

Finally, the model in which the number of clusters (that remains unchanged at a time of input) is N, obtained by the processes in step A8 to A11 is compared with the model where the number of clusters is N+1, obtained by the processes in steps A14 to A17. Then, the model that can describe the input speech data better is selected, and the parameters that define the model are stored in the parameter storage unit 108 (in step A18).

Preferably, a method of selecting the model is comprehensively determined, taking into consideration the goodness of fit (such as a likelihood) of the model to the input speech data and the size of the model (such as the number of the model parameters). As a specific example, a well-known data analysis approach such as an Akaike's Information Criterion (AIC) or a Minimum Description Length (MDL) criterion may be employed. An AIC value or an MDL value on each model should be calculated based on a definition thereof. Then, the model having the maximum AIC value or the minimum MDL value should be selected. As a method of calculating the MDL value, the method disclosed in a literature by Han Te Sun and Kingo Kobayashi, "Applied Mathematics [11] of the Iwanami Lecture, Mathematics of Information and Coding", Iwanami Book Store, 1994, Eighth Chapter", for example, should be employed.

In this exemplary embodiment, the models targeted for selection were set to two types of the models having the number of clusters N and the model having the number of clusters N+1. Selection from among the number of clusters of more types (such as N−1 or N+2) may also be performed. The number of mixtures M of the Gaussian mixture distribution defined by each cluster can also be taken into account for selection. The numbers of clusters which are set to selection candidates and speech data that belong to the respective clusters of the numbers should be determined according to a predetermined criterion based on a probability of each speech data classified into each cluster calculated so far.

The speaker data storage unit 102 in this exemplary embodiment functions when speech data of a known speaker is present. Even if this unit is not present, this exemplary embodiment is established. Similarly, since the speech classification probability updating unit 106 may target all of a predetermined number of speech data, this exemplary embodiment is established without the update target speech selection unit 105. The speech classification probability updating unit 106 does not operate when δ is set to 1. Thus, the speech classification probability updating unit 106 is not needed. In this case as well, this exemplary embodiment can be effective.

Next, an effect of this exemplary embodiment will be described. In this exemplary embodiment, the speech classification probability calculation unit 103 probabilistically classifies sequentially input speech data, using the generative model defined by the model parameters. Further, the parameter updating unit 107 successively updates the model parameters based on a result of classification by the speech classification probability calculation unit 103. Thus, the speech data can be accurately classified with a realistic memory use amount and a realistic process time. That is, the sequentially input speech data can be classified by an on-line operation. Further, the speech classification probability updating unit 106 reclassifies a predetermined number of latest speech data using latest values of the model parameters updated by the parameter updating unit 107. Thus, a process of modifying a classification error by verifying a result of classification in the past can also be performed by the on-line operation.

Further, as the generative model of a speech data distribution, the hidden Markov model, which is the probability model associated with the Gaussian mixture distribution is assumed. Thus, compared with the generative model associated with classification using a local criterion such as a minimum distance or the normal distribution, a speech signal composed of various phonemes having different distributions can be represented (modeled) by a detailed distribution structure. As a result, a classification error caused by a search error can be suppressed to be low.

This exemplary embodiment is so configured that the generative model is generated by using speech data of a known speaker stored in the speaker data storage unit 102. Thus, by storing speech data of a lot of speakers in the speaker data storage unit 102, classification accuracy can be increased. Further, this exemplary embodiment is so configured that the update target speech selection unit 105 determines whether or not reclassification is needed based on a result of classification of speeches in the past. Thus, the speech classification probability updating unit 106 can effectively perform calculation of reclassification. A classification process can be performed at a comparatively high speed.

In this exemplary embodiment, the new speaker registration unit 104 assumes emergence of a new speaker, and generates the generative model when the number of clusters is increased. The cluster number determination unit 110 compares a result of classification when the number of clusters is increased with a result of classification using the existent number of clusters to determine the number of clusters. By performing such dynamic clustering, classification using the optimal number of clusters can be constantly performed by the on-line process without unnecessarily limiting an application range.

That is, a classification probability is calculated based on the probability model to perform clustering, and the model parameters are updated based on the classification probability. In this manner, this exemplary embodiment is so configured that information (probability model and classification probability) is mutually utilized. Thus, objects of the present invention such as a higher-speed and a higher accuracy of a clustering processing can be achieved.

Second Exemplary Embodiment

Figure 5:
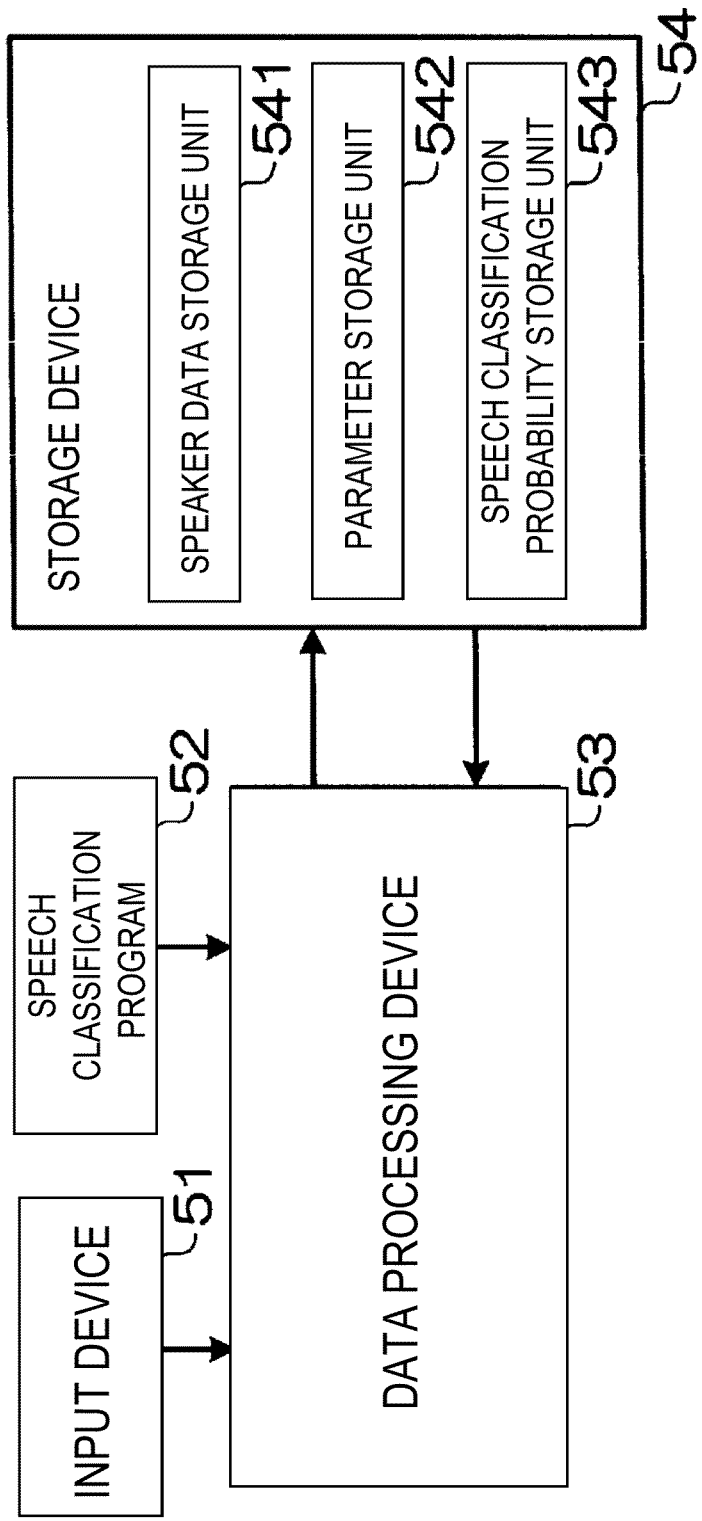
FIG. 5 is a block diagram showing a configuration example of a speech classification apparatus according to a second exemplary embodiment.
Figure 6:
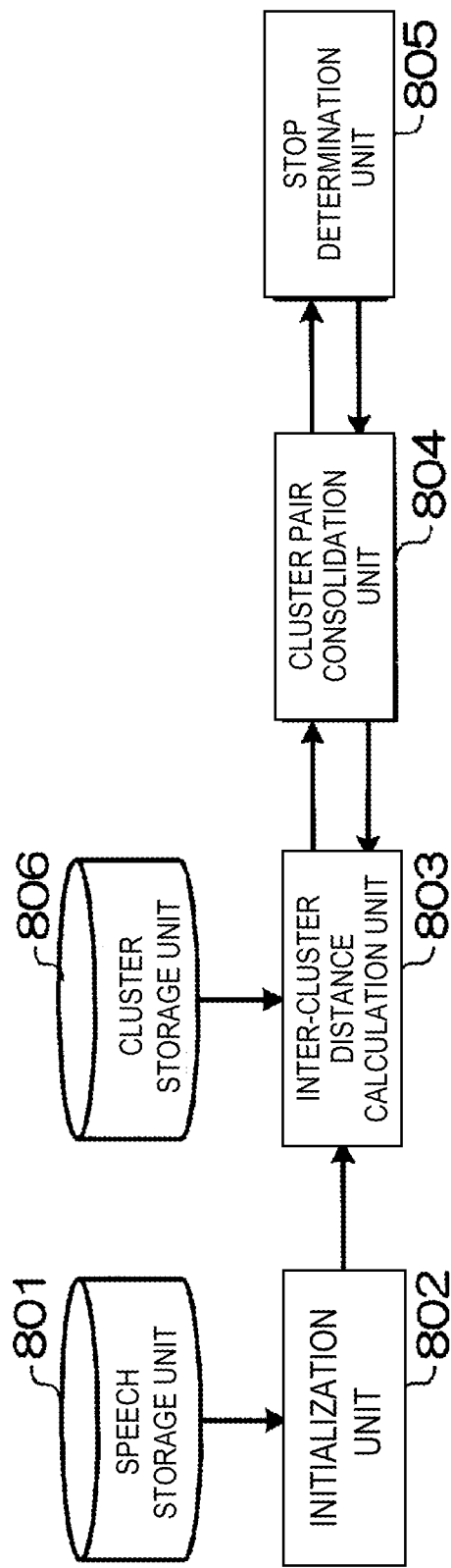
FIG. 6 is a block diagram showing a configuration example of a speech classification apparatus using a minimum distance method.
Figure 7:
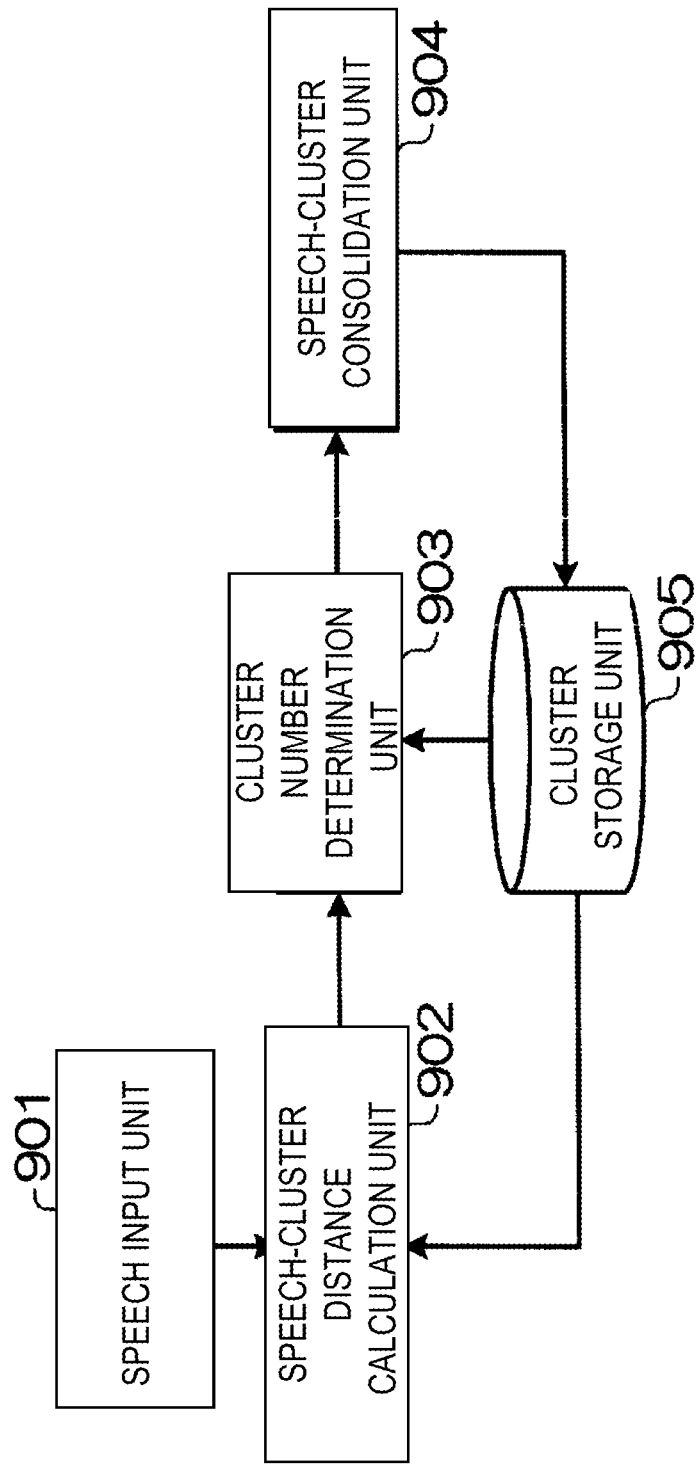
FIG. 7 is a block diagram showing another configuration example of the speech classification apparatus using the minimum distance method.

Next, a second exemplary embodiment of the present invention will be described with reference to drawings. FIG. 5 is a block diagram showing a configuration example of a speech classification apparatus according to a second exemplary embodiment. This exemplary embodiment shows a configuration example of a computer that loads a program and operates when an operation of each means in the first exemplary embodiment is implemented by the program. As shown in FIG. 5, the speech classification apparatus in this exemplary embodiment is implemented by the computer including an input apparatus 51, a speech classification program 52, a data processing apparatus 53, and a storage apparatus 54.

The input apparatus 51 is a microphone that receives a speech signal of a speech uttered outside. The input apparatus 51 may be a receive apparatus which receives the speech signal segmented according to a predetermined condition transmitted from a communication terminal not shown when the computer is connected to a communication network.

The speech classification program 52 is the program that describes operations of the speech classification probability calculation unit 103, new speaker registration unit 104, update target speech selection unit 105, speech classification probability updating unit 106, parameter updating unit 107, and cluster number determination unit 110 in the first exemplary embodiment. The speech classification program 52 is loaded onto a data processing apparatus 53 such as a CPU and controls the operation of the data processing apparatus 53. That is, the data processing apparatus 53 operates according to the speech classification program 52.

The storage apparatus 54 includes a speaker data storage unit 541, a parameter storage unit 542, and a speaker classification probability storage unit 543. The speaker data storage unit 541 corresponds to the storage region of speaker data storage unit 102 in the first exemplary embodiment. The parameter storage unit 542 corresponds to the storage region of parameter storage unit 108. The speaker classification probability storage unit 543 corresponds to the storage region of speech classification probability storage unit 109. While the speaker data storage unit 541 is the storage region in which speaker data is stored in advance, the parameter storage unit 542 and the speaker classification probability storage unit 543 are the storage regions assigned by the speech classification program 52.

By control of the speech classification program 52, the data processing apparatus 53 executes same processes as those of the speech classification probability calculation unit 103, new speaker registration unit 104, update target speech selection unit 105, speech classification probability updating unit 106, parameter updating unit 107, and cluster number determination unit 110 in the first exemplary embodiment on speech data sequentially input from the input apparatus 51 while reading in data stored in the speaker data storage unit 541 and writing data into the parameter storage unit 542 and the speaker classification probability storage unit 543 or reading the data stored in the parameter storage unit 542 and the speaker classification probability storage unit 543 as necessary.

Industrial Applicability

The present invention can be applied to a speech recognition apparatus in general in which an acoustic model is adapted for each speaker or for each environment, thereby performing speech recognition with high accuracy. The present invention can be applied to a retrieval apparatus that retrieves a speaker or the like from a speech signal. The present invention can be applied to a speaker retrieval apparatus in a transcription support system (minutes creation system) that converts a speech for a long period of time to a text or assigns a speaker label to the text and a video and speech retrieval system in which a text or speaker index is automatically assigned to a large volume of video and speech data and used as a cue for retrieval.

The above description was given about the present invention in connection with the exemplary embodiments described above. The present invention is not limited to the configurations of the exemplary embodiments described above alone, and of course includes various variations and modifications that could be made by those skilled in the art within the scope of the present invention.

Modifications and adjustments of the exemplary embodiment and exemplary embodiments are possible within the scope of the overall disclosure (including claims) of the present invention, and based on the basic technical concept of the invention. Various combinations and selections of various disclosed elements are possible within the scope of the claims of the present invention.

What is claimed is:

1. A speech classification apparatus that classifies speech signals into clusters based on vocal similarity, comprising:
a speech classification probability calculation unit that calculates a probability that a latest input one of the speech signals sequentially input belongs to each of the clusters, based on a probability model for probabilistically determining to which cluster a certain speech signal belongs; and
a parameter updating unit that successively estimates values of parameters that define the probability model using each probability calculated by the speech classification probability calculation unit and a sufficient statistic calculated based on a speech signal inputted before the latest input one of the speech signals;
the speech classification probability calculation unit calculating each probability based on the probability model defined by latest values of the parameters successively estimated by the parameter updating unit.

2. The speech classification apparatus according to claim 1, comprising:
a speech classification probability updating unit that recalculates probabilities that the speech signals which have been input within predetermined times in the past belong to the respective clusters, based on the probability model defined by the latest values of the parameters successively estimated by the parameter updating unit;
the parameter updating unit estimating the parameters that define the probability model using each of the probabilities calculated by the speech classification probability updating unit and a sufficient statistic calculated based on a speech signal inputted before the predetermined times.

3. The speech classification apparatus according to claim 1, comprising:
a new cluster registration unit that generates a probability model that defines a new cluster to which the input speech signal belongs, assuming a case where the input speech signal does not belong to any cluster; and
a cluster number determination unit that determines whether or not to add the new cluster from a result of parameter estimation by the parameter updating unit based on a result of calculation using the probability model generated by the new cluster registration unit.

4. The speech classification apparatus according to claim 1, wherein the probability model includes a hidden Markov model in which states are in a one-to-one correspondence with the clusters.

5. The speech classification apparatus according to claim 4, wherein the probability model includes a hidden Markov model associated with a Gaussian mixture distribution having a number of mixtures corresponding to a number of types of phonemes.

6. The speech classification apparatus according to claim 2, comprising:
an update target speech selection unit that determinants whether or not to cause the speech classification probability updating unit to recalculate a probability that each of the speech signals input within the predetermined times in the past belongs to each cluster.

7. The speech classification apparatus according to claim 6, wherein the update target speech selection unit determines whether or not recalculation of the probability that each of the speech signals belongs to each cluster is needed, based on an entropy of the calculated probability that each of the speech signals belongs to each cluster at a time of the determination as to the recalculation.

8. The speech classification apparatus according to claim 3, wherein in case the speech signal where the cluster to which the speech signal should belong is known is provided in advance, the new cluster registration unit generates a probability model that defines the cluster to which the speech signal should belong.

9. A speech classification method that classifies speech signals into clusters based on vocal similarity, comprising:
calculating a probability that a latest input one of the speech signals sequentially input belongs to each cluster, based on a probability model for probabilistically determining to which cluster a certain speech signal belongs;

successively estimating parameters that define the probability model using the probability and a sufficient statistic calculated based on a speech signal inputted before the latest input one of the speech signals; and calculating a probability that at least next input speech signal belongs to each cluster, based on the probability model defined by the successively estimated parameters.

10. The speech classification method according to claim 9, comprising: recalculating probabilities that the speech signals which have been input within predetermined times in the past belong to the respective clusters, based on the probability model defined by the latest values of the successively estimated parameters; and estimating the parameters that define the probability model using each of the recalculated probabilities and a sufficient statistic calculated based on a speech signal inputted before the predetermined times.

11. The speech classification method according to claim 9 comprising: generating a probability model that defines a new cluster to which the input speech signal belongs, assuming a case where the input speech signal does not belong to any cluster; and determining whether or not to add the new cluster from a result of parameter estimation based on a result of calculation using the generated probability model.

12. The speech classification method according to claim 9, wherein the probability model includes a hidden Markov model in which states are in a one-to-one correspondence with the clusters.

13. The speech classification method according to claim 12, wherein the probability model includes a hidden Markov model associated with a Gaussian mixture distribution having a number of mixtures corresponding to a number of types of phonemes.

14. The speech classification method according to claim 10, comprising: determining whether or not to need recalculation of a probability that each of the speech signals input within the predetermined times in the past belongs to each cluster.

15. The speech classification method according to claim 14, comprising: determining whether or not to need recalculation of the probability that each of the speech signals belongs to each cluster, based on an entropy of the calculated probability that each of the speech signals belongs to each cluster at a time of the determination as to the recalculation.

16. The speech classification method according to claim 10, comprising: Generating a probability model that defines the cluster to which the speech signal should belong when the speech signal where the cluster to which the speech data should belong is known is provided in advance.

17. A non-transitory computer-readable recording medium storing a speech classification program that classifies speech signals into clusters based on vocal similarity, the speech classification program causing a computer to execute:

a probability calculation processing that calculates a probability that a latest input one of the speech signals sequentially input belongs to each cluster, based on a probability model for probabilistically determining to which cluster a certain speech signal belongs; and a parameter update processing that successively estimates parameters that define the probability model using each probability calculated by the speech classification probability calculation processing and a sufficient statistic calculated based on a speech signal inputted before the latest input one of the speech signals;

the probability calculation processing calculating each probability based on the probability model defined by latest values of the successively estimated parameters.

18. The non-transitory computer-readable recording medium according to claim 17, wherein the speech classification program causes the computer to execute:

a probability recalculation processing that recalculates probabilities that the speech signals which have been input within predetermined times in the past belong to the respective clusters, based on the probability model defined by the latest values of the successively estimated parameters, the parameter updating processing successively estimating the parameters that define the probability model using each of the probabilities calculated by the probability recalculation process and a sufficient statistic calculated based on a speech signal inputted before the predetermined times.

19. The non-transitory computer-readable recording medium according to claim 17, wherein the speech classification program causes the computer to execute the processing comprising:

generating a probability model that defines a new cluster to which the input speech signal belongs, assuming a case where the input speech signal does not belong to any cluster; and determining whether or not to add the new cluster from a result of parameter estimation based on a result of calculation using the probability model that defines the new cluster.

20. The non-transitory computer-readable recording medium according to claim 17, wherein the probability model includes a hidden Markov model in which states are in a one-to-one correspondence with the clusters.

21. The non-transitory computer-readable recording medium according to claim 20, wherein the probability model includes a hidden Markov model associated with a Gaussian mixture distribution having a number of mixtures corresponding to a number of types of phonemes.

22. The non-transitory computer-readable recording medium according to 18, wherein the speech classification program causes the computer to execute the processing comprising:

determining whether or not to need recalculation of a probability that each of the speech signals input within the predetermined times in the past belongs to each cluster.

23. The non-transitory computer-readable recording medium according to claim 22, wherein the speech classification program causes the computer to execute the processing comprising:

determining whether or not recalculation of the probability that each of the speech signals belongs to each cluster is needed in the determination process, based on an entropy of the calculated probability that each of the speech signals belongs to each cluster at a time of the determination as to the recalculation.

24. The non-transitory computer-readable recording medium according to claim 17, wherein the speech classification program causes the computer to execute the processing comprising:

generating a probability model that defines the cluster to which the speech signal should belong when the speech signal where the cluster to which the speech signal should belong is known is provided in advance.

25. A speech classification system that performs a clustering process which generates a cluster in response to each of sequentially input speech data on-line, the system comprising:
- a speech classification probability calculation unit that derives a probability that a latest one of the sequentially input speech data belongs to each cluster, using a generation model which is defined by parameter values stored in parameter storage unit, assuming a speech data distribution, and storing the probability in speech classification probability storage unit;
- an update target speech selection unit that determines whether or not recalculation of the probability that each of the speech data belongs to each cluster is needed according to a magnitude relation between a predetermined threshold value and an indicator, the indicator being obtained by reversing a sign of an entropy of the probability that each of the speech data belongs to each cluster;
- a speech classification probability updating unit that derives a probability that speech data, the probability of which is determined to be needed by the update target speech selection unit, out of predetermined items of the sequentially input speech data except the latest speech data belongs to each cluster and that updates the speech classification probability storage unit; and
- a parameter updating unit that calculates sufficient statistics necessary for calculating the generation model on each of the numbers of clusters and uses each of the probabilities calculated by the speech classification probability calculation unit and a sufficient statistic calculated based on a speech data inputted before the latest one of the sequentially input speech data to estimate parameter values of the generation model, assuming a current number of clusters and some numbers of clusters in the vicinity of the current number of clusters, based on results of calculations by the speech classification probability calculation unit and the speech classification probability updating unit, and that successively updates the parameter values in the parameter storage unit with the estimated parameter values.

26. The speech classification system according to claim 25, comprising:
- a new speaker registration unit that reads parameters and sufficient statistics of the generation model stored in the parameter storage unit and generating a generation model with the number of clusters being incremented by one; and
- a cluster number determination unit that determines an optimal number of clusters among the some numbers of clusters assumed by the parameter updating unit from a result of estimation of the parameter values of the generation model by the parameter updating unit, and storing sufficient statistics and parameter values corresponding to the determined number of clusters in the parameter storage unit.

* * * * *